May 16, 1950  S. O. ARMSTRONG  2,507,948
WEED PULLER
Filed June 6, 1947
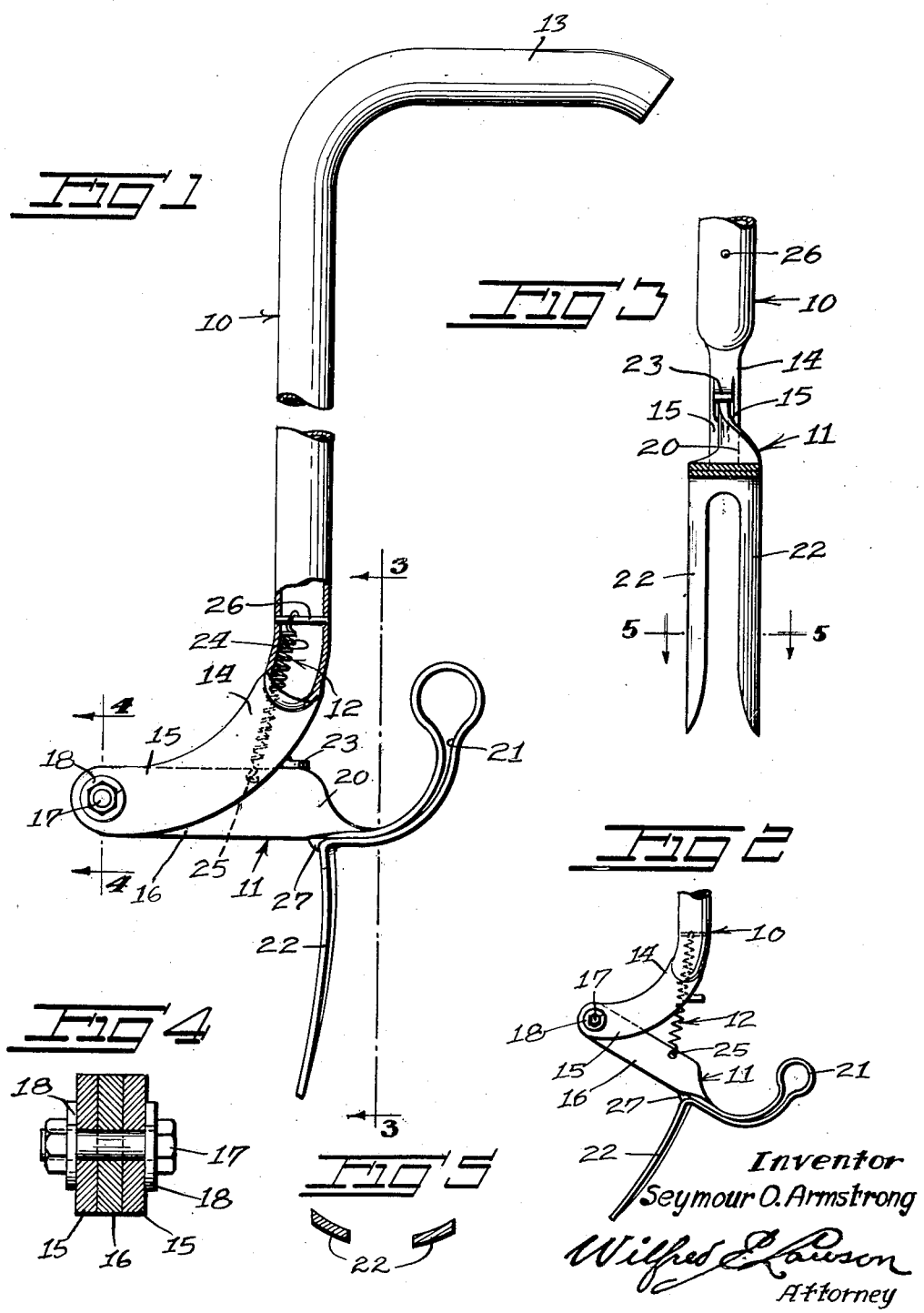
Inventor
Seymour O. Armstrong
Wilfred Lawson
Attorney Patented May 16, 1950

2,507,948

UNITED STATES PATENT OFFICE 2,507,948

WEED PULLER

Seymour Orson Armstrong, Vancouver, Wash.

Application June 6, 1947, Serial No. 753,067

4 Claims. (Cl. 294—50.6)

This invention relates to weed pullers consisting of two main parts namely a handle and a foot member, which is hinged yieldingly in the lower end of the former and constitutes the actual weed remover or extractor. The tool is of very simple construction, made of easily obtainable material, is strong and sturdy in construction and can be manufactured at low cost.

This tool is very simple in operation and has been found to work to great satisfaction.

These and other objects and advantages of the invention will be understood from the subjoined description aided by the accompanying drawing, wherein like numerals denote the same details in the different views.

Figure 1 is a view in side elevation, with portions broken away of a weed puller constructed in accordance with an embodiment of the invention;

Figure 2 is a fragmentary view in side elevation and on a reduced scale showing the extractor fork in a second position;

Figure 3 is a sectional view taken substantially on the line 3—3, of Figure 1, looking in the direction of the arrow;

Figure 4 is an enlarged sectional view taken substantially on the line 4—4, of Figure 1, looking in the direction of the arrow; and Figure 5 is a sectional view taken substantially on the line 5—5, of Figure 3, looking in the direction of the arrow.

As stated, the two main parts of this tool are the handle 10 and the weed extractor or weed puller member proper 11 to which should be added a lifting spring 12.

The handle 10 is made of metal tubing of a length sufficient for a man using it in upright position.

The upper end of the handle is bent back to form a crook or hand grip 13 and the lower end 14 is bent forward to provide a hinge portion 15 for the extractor 11. The hinge portion 15 is obtained by splitting the lower end of tube 14 a short distance back and flattening out the resultant fingers to form bearings for a hinge bolt 17 with lock washers 18 at both ends, and on which bolt the long member 16 of the extractor 11 is mounted to swing.

The extractor member 16 is made of flat iron bar or strap about ⅛ inch thick and one inch wide, one end of which has a hole to fit the hinge bolt 17. At a distance about three inches back of this bolt, the bar is twisted as at 20, about 90° and continued upwards. It is then doubled over to provide a broad foot rest 21, then bent forward under said twist 20, where the bar is bent straight down to form the extractor fork 22 with two prongs, sharpened at their ends. In order to provide a firm connection for the prongs, a weld 27 is provided at the bend under the edge of the straight portion 11 of the extractor 11. An abutment heel 23 is formed on the end 14 of the tubular handle 10 to provide a stop to limit the upward swing of the extractor member. A helical spring 24 has its lower end pinned fast as at 25 to the extractor member 11, and its upper end held by another pin 26 a short distance up in the handle 10.

By this means the extractor prongs 22 will normally be in alinement with the axis of the handle 10 as shown in Figure 1. In that position the prongs enter the ground behind the root of the weed, with the handle in upright position.

With pressure exerted on the handle grip or crook 13 and the operator standing upright the prongs 22 dig into the ground. Now the operator presses with his foot on the rest 21, and while his foot is in this position lifts or pulls the handle 10 thereby swinging the prongs 22 forward to dig the root from the ground. When the tool is lifted up and the weed removed, the extractor member 11 will fly back into idle position actuated by the helical spring 24.

I claim:

1. A weed extractor of the character described, comprising a relatively long handle, a hand grip at one end of the handle, the handle at its opposite end having a forwardly curving terminal portion, a relatively long member having one end pivotally connected with the forward end of said curved terminal portion, said long member extending rearwardly across the lower end of said handle, a foot rest carried at the rear end of said member, a downwardly extending digging prong coupled with said member intermediate its ends and substantially in line with said handle, and a spring element connecting said long member with the handle and normally urging upward swinging movement of the long member to a position substantially perpendicular to the handle.

2. A weed extractor of the character described in claim 1, wherein said handle is of tubular material and has the forwardly curving terminal portion longitudinally divided to provide two spaced members between the forward ends of which the said forward end of the long member is oscillatably mounted, the said spring extending upwardly into the lower end of the tubular handle, and a movement limiting heel connected to the forwardly curving terminal portion at a position adjacent to the lower end of the handle, said long member abutting the underside of said heel when in the said perpendicular position.

3. A weed extractor of the character described comprising a relatively long tubular handle, a hand grip at one end of the handle, said handle at its other end being longitudinally divided to provide two spaced parallel portions, said portions being arcuate and extending downwardly and forwardly from the handle, a relatively long member of strap form having one end between said curved portions, a pivot bolt connecting the said one end with the forward ends of said terminal portions whereby said member has up and down oscillatory movement, said member at its other end curving upwardly on the side of the handle remote from the pivot bolt and providing a foot rest, an earth penetrating prong connected to the underside of said long member and extending downwardly substantially in line with the handle, and a contractile spring connected at one end with said long member and extending upwardly into and connected with the lower end of the tubular handle, said spring functioning to pull the said long member upwardly to a position in which it is substantially perpendicular to the handle.

4. A weed extractor of the character described in claim 3, with an abutment heel secured to the rear convex edges of said forwardly curving portions and overlying and contacted by the upper edge of said long member to limit the upward movement of the latter.

SEYMOUR ORSON ARMSTRONG.

REFERENCES CITED

The following references are of record in the file of this patent:

UNITED STATES PATENTS

| Number | Name | Date |
|---|---|---|
| 175,528 | Trussell | Mar. 28, 1876 |
| 943,325 | Stewart | Dec. 14, 1909 |